(12) United States Patent
Decker

(10) Patent No.: US 8,199,882 B2
(45) Date of Patent: Jun. 12, 2012

(54) INTEGRATED COLLIMATOR

(75) Inventor: Keith Decker, Pleasant Grove, UT (US)

(73) Assignee: Moxtek, Inc., Orem, UT (US)

( * ) Notice: Subject to any disclaimer, the term of this patent is extended or adjusted under 35 U.S.C. 154(b) by 325 days.

(21) Appl. No.: 12/632,360

(22) Filed: Dec. 7, 2009

(65) Prior Publication Data

US 2011/0135068 A1    Jun. 9, 2011

(51) Int. Cl.
*G21K 1/02* (2006.01)
(52) U.S. Cl. ........................................ 378/147
(58) Field of Classification Search ............... 378/147; 250/336.1, 505.1; 216/13
See application file for complete search history.

(56) References Cited

U.S. PATENT DOCUMENTS

| 4,560,877 A | 12/1985 | Hoffman |
| 4,965,861 A | 10/1990 | Filthuth |
| 5,059,802 A * | 10/1991 | Filthuth ..................... 250/374 |

FOREIGN PATENT DOCUMENTS

| EP | 0808465 | 8/2003 |
| KR | 10-0689177 | 3/2007 |
| WO | WO 96-37791 | 11/1996 |

OTHER PUBLICATIONS

PCT Application PCT/US2010/056001; filed Nov. 9, 2010; Keith Decker; International Search Report mailed Jun. 23, 2011.

* cited by examiner

*Primary Examiner* — Jurie Yun
(74) *Attorney, Agent, or Firm* — Thorpe North & Western LLP

(57) ABSTRACT

A radiation detector with an integrated collimator. The collimator may be deposited on an anode or cathode face of the radiation detector. An insulating material may be deposited between the collimator and the radiation detector if the collimator is deposited on the anode side. The collimator may be comprised of a single layer or of multiple layers. Patterning and etching may be used to create an aperture in the collimator to allow x-rays to impinge on a full charge collection region of the radiation detector intrinsic region.

21 Claims, 4 Drawing Sheets

INTEGRATED COLLIMATOR

FIELD OF THE INVENTION

The present invention relates to radiation detectors.

BACKGROUND

A radiation detector 10 can include an intrinsic region 11, an anode 12, and a cathode 18 as shown in FIGS. 1 and 2. Radiation detectors can include other components not shown, such as a guard ring. The anode 12 can be disposed at one face of the radiation detector, called an "anode face". The cathode 18 can be disposed at the opposite face of the radiation detector, called a "cathode face". The term "face" may be used in referring to either the "anode face" or the "cathode face".

Radiation, such as x-rays, impinging upon the radiation detector can be absorbed by the detector. Each x-ray photon that is absorbed can create charge carriers, comprised of electron—hole pairs. Due to a potential difference between the anode and the cathode, positive charge carriers (holes) can be drawn to the anode and negative charge carriers (electrons) can be drawn to the cathode. The number of charge carriers created is proportional to the energy of the x-ray photon. Different materials produce different x-ray photon energies, thus the number of charge carriers can be used to determine the type of material that produced the x-rays.

The intrinsic region 11 can be divided into a full-charge collection region 17 and a partial-charge collection region 16. The full-charge collection region 17 is the portion of the intrinsic region 11 that is substantially within the width or area of the anode 12, or between the anode 12 and the cathode 18. The partial-charge collection region 16 is the portion of the intrinsic region 11 that is substantially outside the width or area of the anode 12.

When x-ray photons impinge upon the partial-charge collection region 16, typically only some of the generated holes reach the anode. The remaining holes can be lost to a guard ring or to recombination. As a result of less than all of the holes produced by the x-rays reaching the anode, an incorrect indication can be given of the type of material that produced the x-ray. In contrast, if x-rays impinge upon the full-charge collection region 17, substantially all of the charge carriers can reach the anode, resulting in a more accurate signal for indication of the type of material that produced such x-rays. Signals with a size that accurately reflect the number of charge carriers generated within the detector contribute to the "full energy peak" and can be used to determine the type of material that produced the x-rays. Signals that are reduced because of the loss of charge carriers to recombination or to the guard ring contribute to "background" and interfere with the determination of the type of material that produced the x-rays.

In order to avoid x-rays impinging on the partial-charge collection region 16, a collimator 14 can be used. The purpose of the collimator is to block x-rays that would otherwise impinge on the partial-charge collection region 16. Collimators can be attached to the radiation detector by standoffs 13. The standoffs 13 can be attached to the radiation detector and to the collimator by an adhesive. The standoffs can have a height h of about 100 to 200 micrometers such that the standoffs hold the collimator about 100 to 200 micrometers away from the face.

The collimator can have an opening 15 to allow x-rays to impinge on the full-charge collection region 17. Because x-rays do not all come directionally perpendicular to the surface of the radiation detector, such as x-rays 21a or 21d, the width w1, dimension or area of the collimator opening 15 is typically less than the width w2, dimension or area of the anode in order to block such x-rays.

Having a width w1, dimension or area of the collimator opening 15 that is less than the width w2, dimension or area of the anode can result in some undesirable blocking of x-rays. For example, x-ray 21b would impinge on the full-charge collection region 17 if it were not blocked by the collimator 14. Such undesirable blocking of x-rays can result in an undesirable longer collection time required for determination of the x-ray signal strength and thus the type of material that produced the x-ray.

Alignment of the collimator 14 above the radiation detector, such that the opening 15 in the collimator is centered over the anode 12, is important for blocking x-rays that would otherwise impinge on the partial-charge collection region 16 and for avoidance of blocking x-rays that that would impinge upon the full-charge collection region 17. Such collimator alignment can be a difficult manufacturing challenge and can frequently result in misalignment. For example, in FIG. 3, a radiation detector 30 is shown in which the opening 15 in the collimator is not centered over the anode 12. As a result, x-ray 21d, which would be blocked if the collimator 14 were properly aligned, is not blocked and impinges upon the partial-charge collection region 16. Also, x-ray 21c, which is directed at the full-charge collection region 17, would not be blocked if the collimator were properly aligned, but is now blocked due to collimator misalignment. Thus misalignment of the collimator can result in the undesirable results of x-rays impinging on the partial-charge collection region 16 and or blocking of x-rays that would otherwise impinge on the full-charge collection region 17.

As a collimator blocks an x-ray, it can absorb the energy of that x-ray and emit an x-ray that has an energy that is characteristic of the collimator material. Collimator materials that have high atomic numbers are more effective at blocking high energy x-rays. A disadvantage of the use of high atomic number collimator materials, however, is that x-rays emitted from the high atomic number collimator material can be similar in energy to the x-rays being measured, that were emitted from a sample material. Because of this similarity in x-ray energy between x-rays emitted from the sample material and x-rays emitted from the collimator, x-rays emitted from the collimator can interfere with determination of the type or quantity of material that is being analyzed. In contrast, a collimator material with a low atomic number can result in emission of x-rays that are so low in energy that there is little effect on detector performance. A problem of low atomic number collimator materials is that they can be less effective at blocking high energy x-rays emitted from the sample.

SUMMARY OF THE INVENTION

It has been recognized that it would be advantageous to create a collimator for a radiation detector that has an opening with a width that is substantially the same as the anode in order to optimize the collection of x-rays directed towards the full-charge collection region while also blocking x-rays directed towards the partial-charge collection region. It has also been recognized that it would be advantageous to create a collimator that can be precisely aligned over the anode. It has also been recognized that it would be advantageous to create a collimator with the advantages of both high atomic number materials and low atomic number materials.

The present invention includes an integrated collimator device comprising at least one layer of collimator material disposed on one face of a radiation detector. The collimator material can be disposed on either the cathode face or the anode face. If the collimator material is disposed on the anode face, an insulating material can be disposed between the collimator and the radiation detector. The collimator can be comprised of a single material or the collimator can be comprised of multiple layers of different materials.

DETAILED DESCRIPTION

Figure 1:
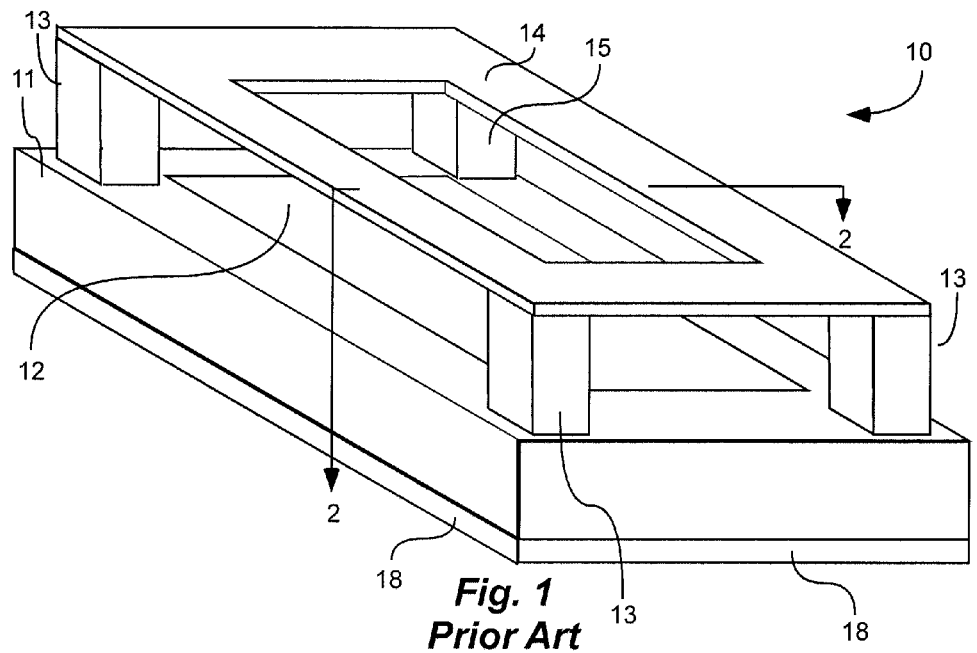
FIG. 1 is a schematic perspective view of a prior-art radiation detector and collimator.
Figure 2:
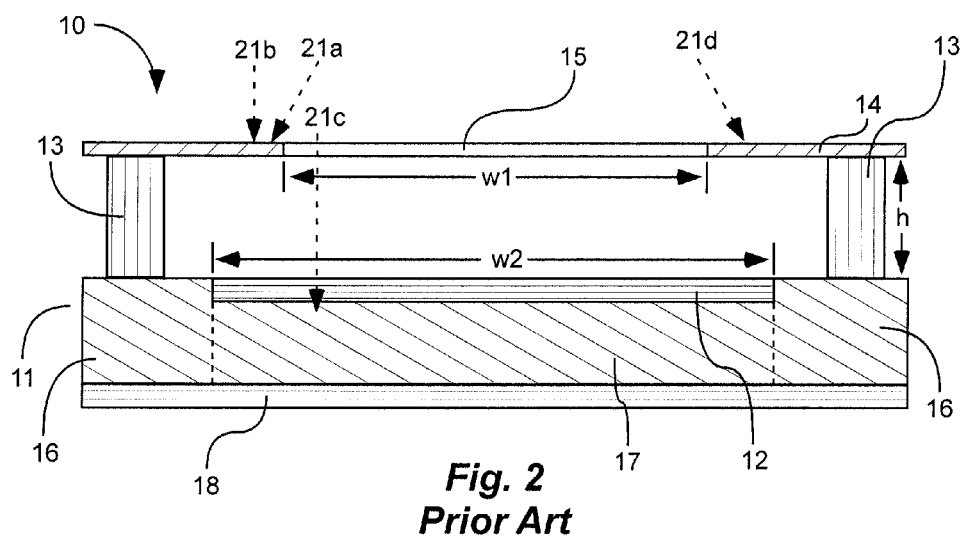
FIG. 2 is a schematic cross-sectional side view of the prior-art radiation detector and collimator of FIG. 1 taken along line 2-2 in FIG. 1.
Figure 3:
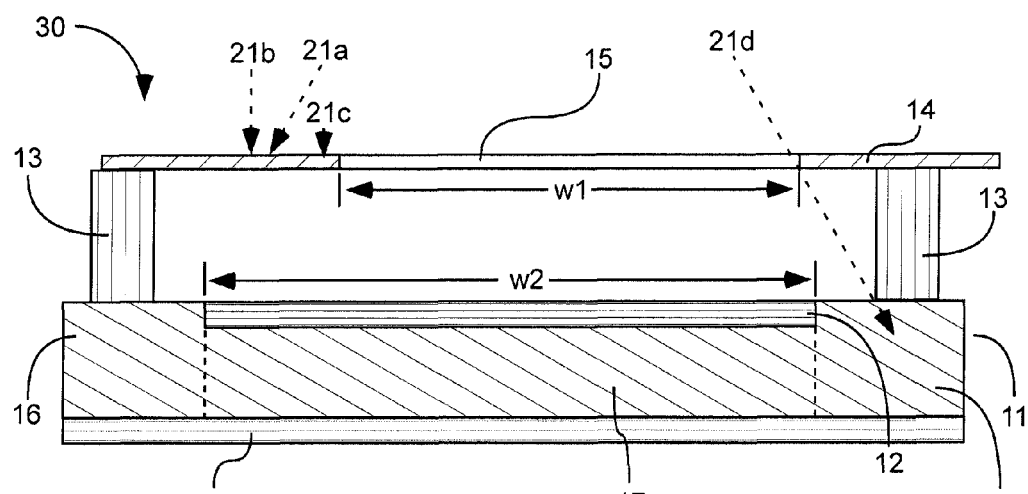
FIG. 3 is a schematic cross-sectional side view of a prior-art radiation detector with a misaligned collimator.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

The term "x-rays" can include radiation of frequencies other than x-rays. The term "x-rays" is used in place of radiation because the invention described is typically used for sensing x-rays. It will be appreciated that this invention can be used for radiation other than x-rays.

Figure 4:
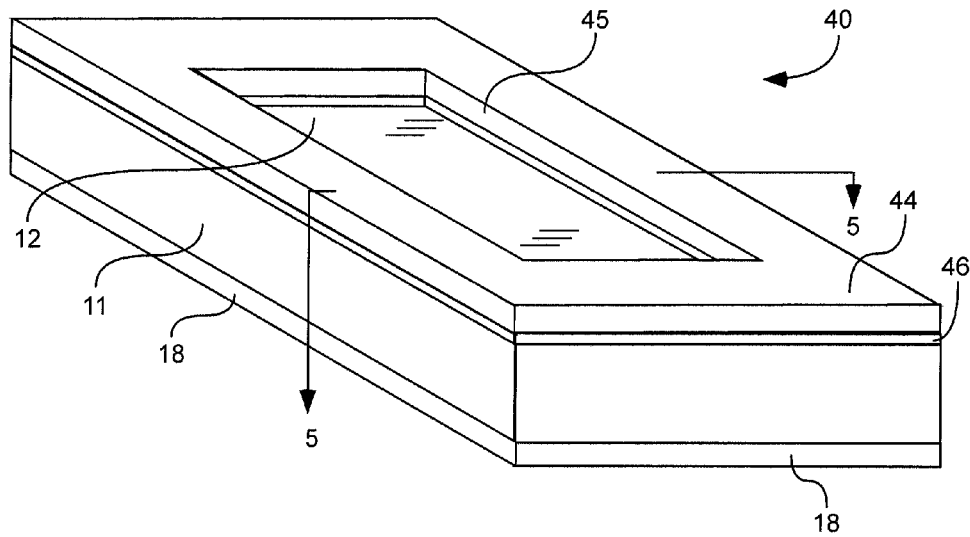
FIG. 4 is a perspective view of a radiation detector with an integrated collimator in accordance with an embodiment of the present invention.
Figure 5:
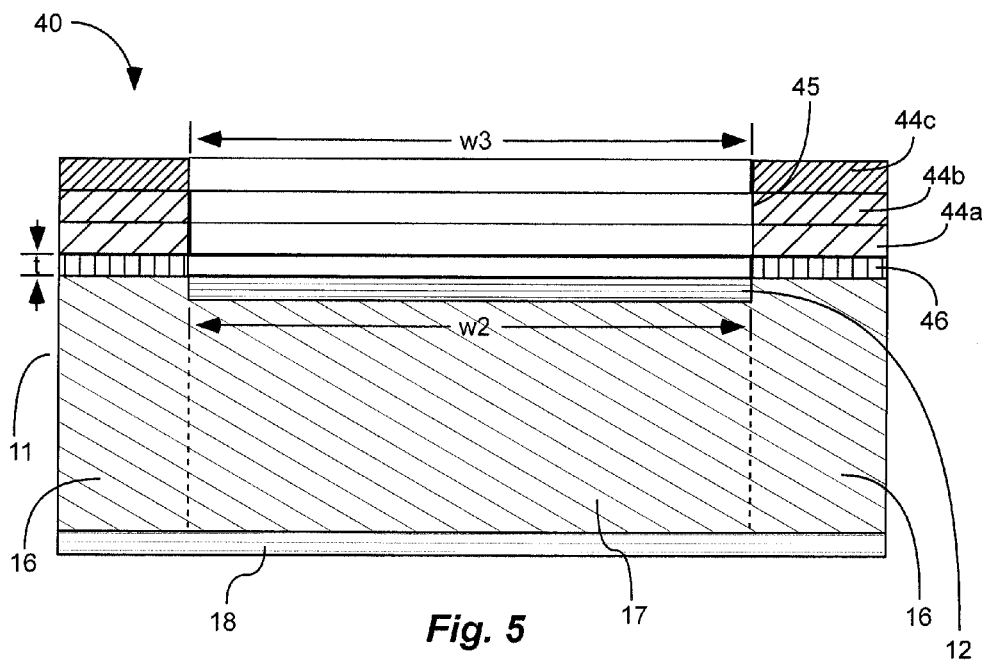
FIG. 5 is a schematic cross-sectional side view of the radiation detector with an integrated collimator of FIG. 5 taken along line 5-5 in FIG. 4.

As illustrated in FIGS. 4-5, a radiation detector 40 with an integrated collimator 44 is shown. The radiation detector can include an intrinsic region 11, an anode 12, and a cathode 18. Radiation detectors can include other components, not shown, such as a guard ring. The anode 12 can be disposed at one face of the radiation detector defining an "anode face". The cathode 18 can be disposed at the opposite face of the radiation detector defining a "cathode face".

The intrinsic region 11 can be divided into a full-charge collection region 17 and a partial-charge collection region 16. The full-charge collection region 17 is the portion of the intrinsic region 11 that is substantially within the width, dimension or area of the anode 12, or between the anode 12 and the cathode 18. The partial-charge collection region 16 is the portion of the intrinsic region 11 that is substantially outside the width, dimension or area of the anode 12.

An electrically insulating material 46 can be deposited on, and become part of, the anode face. The insulating material can have a thickness t of less than about fifty micrometers. It may be preferred to have a thickness of about one to two micrometers. The insulating material can be used to avoid short circuiting of any contacts exposed on the anode face. A collimator 44 can be deposited on the insulating material 46. A thin layer of insulating material 46 can allow the collimator 44 to be disposed closer to the radiation detector. With the collimator 44 closer to the radiation detector 40, the collimator width or aperture can more closely match the width or area of the anode without the undesirable results of x-rays impinging on the partial-charge collection region 16 and or blocking of x-rays that would otherwise impinge on the full-charge collection region 17.

In all embodiments of this invention, depositing the insulating material or the collimator material can include any suitable thin film deposition method such as chemical vapor deposition or physical vapor deposition.

If the insulating material 46 is also effective at blocking x-rays, then the insulting material can function both to avoid short circuiting of any contacts exposed on the anode face and to collimate the x-ray beam, in which case the insulating material can be considered to be part of the collimator 44. For example, if aluminum oxide is the insulating material, then the aluminum oxide can be both an insulating material and a collimator material. If the insulating material is also a collimating material, then the thickness of the insulating material can be thicker, such as greater than 100 micrometers or around 200 micrometers, for more effective blocking of x-rays.

The face of the collimator can be patterned and etched to create an opening or aperture 45 in the collimator material 44 which defines an exposed area on the radiation detector. The etch may proceed through the insulating material 46 also in which case the exposed area can be comprised substantially of the anode. The pattern and etch can be aligned the same for both collimator and insulating material such that the insulating material can have substantially the same surface area as the collimator. Alternatively, the etch may stop at the insulating material 46 such that the exposed area can be the insulating material. Whether the insulating material is exposed or etched may be determined by the type of insulating material used, whether this insulating material could affect desired measurements, and manufacturing requirements. The insulating material can be a continuous single layer, such that there are no gaps between the collimator material and the detector face.

FIGS. 4-5 show an integrated collimator in which the etch has proceeded through the insulating material 46. It will be appreciated that in some designs the etch may not need to proceed through the insulating material, such that the insulating material 46 will be the exposed area.

The etch pattern can be precisely aligned with the anode so that the width w2, dimension or area of the anode 12 can be substantially the same as the width w3, dimension or area of the aperture 45 in the collimator material. Having the width w2, dimension or area of the anode 12 substantially the same as the width w3, dimension or area of the aperture in the collimator material can result in optimal blocking of x-rays directed towards the partial-charge collection region while allowing x-rays to impinge on the full-charge collection region. This can result in a radiation detector having lower background and higher count rate. Use of patterning and etching for alignment of the collimator aperture 45 over the anode 12 can be precise and accurate and can result in substantially improved alignment.

Having the collimator 44 disposed on the detector, or insulating material thereof, eliminates a gap or space that existed between prior art collimators and detectors, and reduces the chance of x-rays entering the aperture 45 at an angle and impinging on the partial-charge collection region 16.

The collimator 44 can be comprised of a single material or the collimator can be comprised of multiple layers of different materials 44a-c. A layer of collimator material 44c that is farthest from the radiation detector can have the highest atomic number of the layers of collimator material. This layer 44c can most effectively block high energy x-rays. The x-rays emitted from this collimator material can have a lower energy than the incoming x-ray. The collimator layer 44b that is the next closest to the radiation detector can have the second highest atomic number and can block the x-rays emitted from the outermost collimator layer 44c. This second collimator material 44b can also emit x-rays that are lower in energy than the x-rays it absorbed. The next layer of collimator material 44a closer to the radiation detector can have the third lowest atomic number and can block the x-rays received from the outer, adjacent layer 44b. This third layer 44a can then emit even lower energy x-rays. Thus, by use of multiple layers of collimator material, with the outermost layer having the highest atomic number, and each subsequent layer closer to the radiation detector having a lower atomic number than the adjacent outer layer, high energy x-rays can be blocked, but the x-rays that eventually impinge on the intrinsic region of the detector can have a low enough energy so as to have minimal adverse effect on the detector performance.

Figure 6:
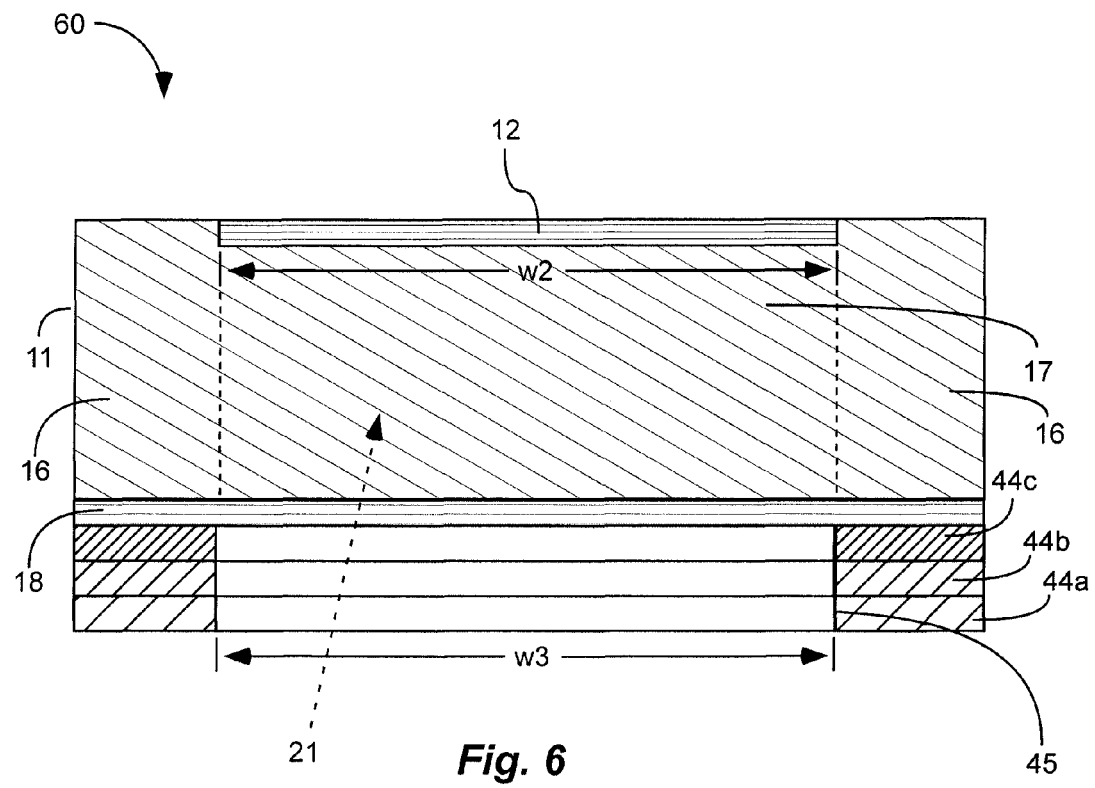
FIG. 6 is a schematic cross-sectional side view of a radiation detector with an integrated collimator in accordance with an embodiment of the present invention.

Although three layers of collimator material 44a-c are shown in FIGS. 5 and 6, more or less than three layers may be used. Although in a preferred embodiment, the outermost layer has the highest atomic number, and each subsequent layer closer to the radiation detector has a lower atomic number than the adjacent outer layer, other configurations of multiple layers of collimator material are within the scope of this invention. For example, multiple layers of a single collimator material may be used or a collimator material may have a lower atomic number than a material that is closer to the radiation detector.

As shown in FIG. 6, another detector 60 is shown with an integrated collimator 44 applied to the cathode face, instead of to the anode face, as was shown in FIGS. 4-5. By applying the collimator material to the cathode face, rather than to the anode face, the need to apply an insulating material can be avoided. In either embodiment, with the collimator material on the anode face or on the cathode face, the side with the collimator typically faces the sample, so that the sample x-rays 21 can be blocked by the collimator.

To make the detector 60 with the integrated collimator 44 as shown in FIG. 6, a collimator material can be deposited on the cathode face 18 of a radiation detector. The face of the collimator can be patterned and etched to create an opening or aperture 45 in the collimator material. The etch pattern can be precisely aligned with the anode so that the width w2, dimension or area of the anode 12 can be substantially the same as the width w3, dimension or area of the aperture 45 in the collimator material. This opening allows x-rays to impinge upon the full-charge collection region 17 while blocking x-rays from the partial-charge collection region 16, resulting in a radiation detector having lower background and higher count rate. Use of patterning and etching for alignment of the collimator opening 45 over the anode 12 or the full-charged collection region 17 can be precise and accurate and can result in substantially improved alignment.

A layer of insulating material 46 may be applied between the collimator 44 and the cathode face 18, but in many radiation detector designs, such insulating material may not be necessary.

The radiation detectors in FIGS. 5 and 6 show three layers of collimator material 44a-c. It will be appreciated that this invention may include more or less than three layers of collimator material. The need to block high energy x-rays and the need for low energy x-rays emitted from the collimator material into the intrinsic region 11 can be balanced against the cost and complexity of applying multiple collimator layers. An example of the use of multiple collimator material layers is to have a layer that contains titanium closest to the radiation detector, a layer that contains chromium as the next outer layer, and a layer that contains tungsten as the outermost layer. A layer of aluminum oxide can be used as both an insulating material and as a collimator material.

Figure 7:
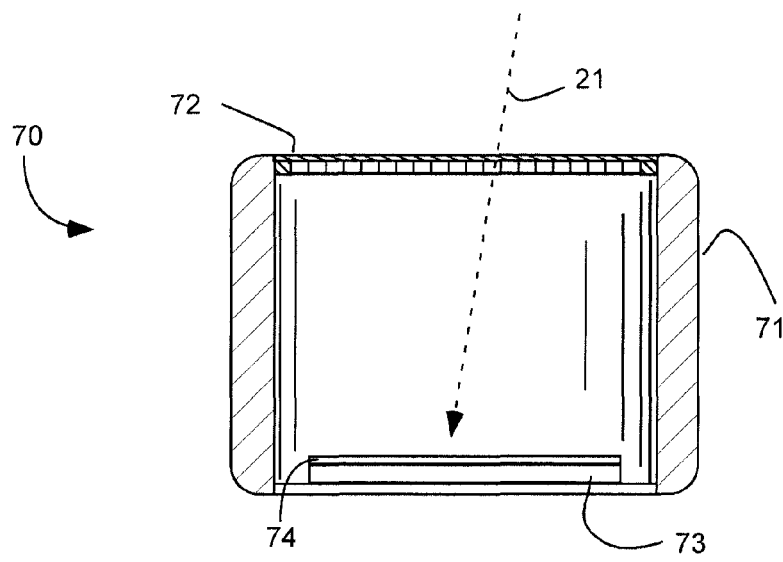
FIG. 7 is a schematic cross-sectional side view of a radiation detection system in accordance with an embodiment of the present invention utilizing the radiation detector with an integrated collimator of FIGS. 4-6.

Referring to FIG. 7, any of the above described integrated collimator embodiments can be utilized with a radiation detection system 70. The radiation detection system can include an integrated collimator 74 disposed on a radiation detector 73. A hermetically sealed container 71 can surround the integrated collimator 74 and the radiation detector 73. A window 72 in the container 71 can allow x-rays, represented by line 21, to pass into the container and impinge upon the radiation detector.

It is to be understood that the above-referenced arrangements are only illustrative of the application for the principles of the present invention. Numerous modifications and alternative arrangements can be devised without departing from the spirit and scope of the present invention. While the present invention has been shown in the drawings and fully described above with particularity and detail in connection with what is presently deemed to be the most practical and preferred embodiment(s) of the invention, it will be apparent to those of ordinary skill in the art that numerous modifications can be made without departing from the principles and concepts of the invention as set forth herein.

What is claimed is:

1. An integrated collimator device, comprising:
   a) a radiation detector with an anode face and a cathode face;
   b) an anode disposed at the anode face;
   c) an insulating layer deposited on one face of the radiation detector and at least one layer of collimator material deposited on the insulating layer; and
   d) an aperture through the at least one layer of collimator material and defining an exposed area on the radiation detector, the aperture configured to allow radiation to impinge upon the exposed area of the radiation detector.

2. A device as in claim 1, wherein the at least one layer of collimator material comprises at least three layers and each layer comprises a different material.

3. A device as in claim 2, wherein a layer of collimator material closest to the radiation detector has a lowest atomic number of the at least three layers and each successive layer away from the radiation detector has a higher atomic number than an adjacent layer that is nearer the radiation detector.

4. A device as in claim 3, wherein:
   a) the insulating layer is deposited on the anode face of the radiation detector.

5. A device as in claim 1, further comprising a hermetically sealed container surrounding the integrated collimator device and a window in the container configured to allow x-rays to pass into the container and impinge upon the exposed area of the radiation detector.

6. A device as in claim 1, wherein the insulating layer is a continuous layer.

7. A device as in claim 1, wherein a thickness of the insulating layer is less than about 50 micrometers.

8. A device as in claim 1, wherein the aperture extends through the insulating layer.

9. A device as in claim 1, wherein the insulating layer and the at least one layer of collimator material are deposited on the cathode face.

10. A method of making the integrated collimator device of claim 1, the method comprising:
   a) depositing at least one layer of insulating material on one face of the radiation detector;
   b) depositing at least one layer of collimator material on the insulating material;
   b) patterning and etching the collimator material to create an exposed area on the radiation detector;
   c) boundaries of the exposed area correspond to the boundaries of the anode.

11. A method of making the integrated collimator device as in claim 10, wherein the at least one layer of collimator material is deposited on the anode face.

12. A radiation detection system, comprising:
   a) an integrated collimator device comprising:
      i) a radiation detector with an anode face and a cathode face;
      ii) an anode disposed at the anode face;
      iii) an insulating material deposited on the anode face;
      iv) at least three layers of collimator material deposited on the insulating material;
      v) an aperture through the at least three layers of collimator material and defining an exposed area on the radiation detector, the aperture configured to allow radiation to impinge upon the exposed area of the radiation detector;
      vi) a layer of collimator material closest to the radiation detector has a lowest atomic number of the at least three layers and each successive layer away from the radiation detector has a higher atomic number than an adjacent layer that is nearer the radiation detector; and
   b) a hermetically sealed container surrounding the integrated collimator device and a window in the container configured to allow x-rays to pass into the container and impinge upon the exposed area of the radiation detector.

13. An integrated collimator device, comprising:
   a) a radiation detector with an anode face and a cathode face;
   b) an anode disposed at the anode face;
   c) at least one layer of collimator material deposited on the anode face;
   d) an aperture through the at least one layer of collimator material and defining an exposed area on the anode face, the aperture configured to allow radiation to impinge upon the anode face of the radiation detector; and
   e) an area of the anode is substantially the same as an area of the aperture of the collimator material.

14. A device as in claim 13, wherein the anode face of the radiation detector further comprises an insulating material which is deposited on the anode.

15. A device as in claim 14, wherein the insulating material is a continuous layer.

16. A device as in claim 14, wherein the aperture extends through the insulating material such that the exposed area on the radiation detector is the anode.

17. A device as in claim 13, wherein:
   a) the at least one layer of collimator material comprises at least three layers and each layer comprises a different material; and
   b) a layer of collimator material closest to the radiation detector has a lowest atomic number of the at least three layers and each successive layer away from the radiation detector has a higher atomic number than an adjacent layer that is nearer the radiation detector.

18. An integrated collimator device, comprising:
   a) a radiation detector with an anode face and a cathode face;
   b) an anode disposed at the anode face;
   c) at least one layer of collimator material deposited on the cathode face; and
   d) an aperture through the at least one layer of collimator material and defining an exposed area on the radiation detector, the aperture configured to allow radiation to impinge upon the exposed area of the radiation detector.

19. A device as in claim 18, wherein the cathode face of the radiation detector further comprises an insulating material which is deposited on the cathode.

20. A device as in claim 18, wherein an area of the anode is substantially the same as an area of the aperture of the collimator material.

21. A device as in claim 18 further comprising a hermetically sealed container surrounding the integrated collimator device and a window in the container configured to allow x-rays to pass into the container and impinge upon the exposed area of the radiation detector.

* * * * *